United States Patent [19]

Ziegler

[11] Patent Number: 5,765,893
[45] Date of Patent: Jun. 16, 1998

[54] APPARATUS FOR REDUCING HEAD AND NECK INJURIES IN INFANTS RIDING IN MOVING VEHICLES

[76] Inventor: Douglas K. Ziegler, 1350 W. Walnut St., Allentown, Pa. 18102

[21] Appl. No.: 814,381

[22] Filed: Mar. 11, 1997

[51] Int. Cl.$^6$ .................................................. A47D 1/10
[52] U.S. Cl. ........................ 297/256.15; 297/184.12; 297/216.11; 297/250.1; 297/488
[58] Field of Search .................... 297/256.15, 216.11, 297/216.12, 250.1, 184.13, 184.12, 397, 488

[56] References Cited

U.S. PATENT DOCUMENTS

| | | | |
|---|---|---|---|
| 4,311,339 | 1/1982 | Heath | 297/216.11 X |
| 4,339,151 | 7/1982 | Riggs | 297/397 X |
| 4,402,548 | 9/1983 | Mason | 297/464 |
| 4,436,341 | 3/1984 | Converse | 297/256.15 |
| 4,440,331 | 4/1984 | Schimmels | 297/186.13 X |
| 4,500,135 | 2/1985 | Knicheloe | 297/250.1 |
| 4,591,208 | 5/1986 | McDonald et al. | 297/256.15 X |
| 4,607,885 | 8/1986 | del Fierro | 297/397 |
| 4,627,659 | 12/1986 | Hall | 297/488 |
| 4,790,593 | 12/1988 | Davalos et al. | 297/250.1 |
| 4,834,420 | 5/1989 | Sankrithi et al. | 297/250.18 |
| 4,946,221 | 8/1990 | Livingston | 297/184 |
| 5,110,182 | 5/1992 | Beauvais | 297/216.11 |
| 5,232,263 | 8/1993 | D'Ull et al. | 297/184.12 X |
| 5,368,328 | 11/1994 | Kamiyama et al. | 297/216.11 X |
| 5,468,047 | 11/1995 | Goor et al. | 297/256.15 X |
| 5,542,587 | 8/1996 | Broz | 224/415 |
| 5,580,133 | 12/1996 | Knox et al. | 297/397 X |
| 5,588,699 | 12/1996 | Rundle et al. | 297/216.11 |

OTHER PUBLICATIONS

*Headache* Nov. 1989, pp. 643–647 "Closed Head Injury Sequeale: Changing Concepts." William G. Speed, III.
*Pain* vol. 58, 1994, pp. 283–307, "Clinical Review, Whiplash injury" Lee Barnsley, Susan Lord and Nikolai Bogduk.

*Primary Examiner*—Laurie K. Cranmer
*Assistant Examiner*—Rodney B. White
*Attorney, Agent, or Firm*—Harold I. Masteller

[57] ABSTRACT

An improved restraint apparatus for use on an infant vehicle seat to reduce head and neck injury in infants. The improved restraint apparatus comprises a shell and padded lining shaped to partially enclose an infant when the restraint apparatus is attached to the infant vehicle seat. A first envelope of support is formed in an upper portion of the shell and padded lining to receive and support an infant head, and the first envelope of support provides a support against head movement. A second envelope of support is formed in a lower portion of the shell and padded lining and provides a support against torso movement comparable to the support against head movement. This produces a unified restraint system between the head and torso when the restraint apparatus is attached to the infant vehicle seat.

The padded lining has soft glove like pockets that are shaped to receive, support and restrain an infant head and torso. The lining is removable for lining replacement to fit different head and torso sizes. The lining also includes distinct areas of different density in the padding to better absorb energy generated by an impact. The areas of different density in the padding apply a gradual increase in resistance against the head and torso as they are forced against the padded lining.

The improved restraint further includes adjustment for fitting the restraint apparatus to different infant length sizes.

16 Claims, 4 Drawing Sheets

APPARATUS FOR REDUCING HEAD AND NECK INJURIES IN INFANTS RIDING IN MOVING VEHICLES

BACKGROUND OF THE INVENTION

The present invention relates to a restraint apparatus for reducing head and neck injuries in an infant riding in an infant vehicle seat, and in particular, it is directed to a restraint apparatus that improves protection against head and neck injury by providing a unified restraint against the head and torso, the unified restraint preventing a difference in relative acceleration between the infant's head and torso during a vehicular incident.

It is well known that infants are unable to support themselves during the first few months of life. A newborn baby appears completely helpless with its large head and slim fragile neck. Infants have little or no control over their physical movement during the first early months of their life, and an infant head flops helplessly if the child is lifted in an unsupported condition. However, by three to four months the baby gains some control over head movement as the muscles gain strength, and as the head gradually becomes less heavy in relation to the rest of the body.

The topmost vertebra in the spine, named the atlas, supports the skull. It does not have the solid bone mass that is typical of the other vertebrae in the spine. The atlas is a bony ring with a large central opening that receives the occipital bone of the skull. Tough ligaments bind the skull to the spine, and the second neck vertebra has a bony projection that extends into the base of the atlas. This articulation permits the atlas to rotate the skull. However, in an infant, where the ligaments are not yet developed, there is little or no control over this mechanism for controlling head movement. The infant's vulnerable condition becomes even more extreme when the baby is transported at high speeds in land or air vehicles. Sudden changes in velocity or direction, whether caused by impact or other less severe events, cause rapid accelerations or decelerations of the infant's head and torso. Such sudden force changes can cause whiplash and other severe injuries.

These problems are well known in the art. For example, U.S. Pat. Nos. 5,542,587, 5,468,047, 4,607,885 and 4,440,331 teach using supports or restraints that hold a child's head to provide protection against injury during an accident. However, each one of these prior patents fails to recognize that head and neck injuries are caused by a difference in relative acceleration between the head and torso. They also fail to provide a support apparatus that will restrain the head and torso as a single unit. For example, Broz shows attaching a helmet (57) to an infant carrier body (41) with strap (59), and then recites that his apparatus presents a minimal load on the infant' head and neck areas. Broz fails to teach restraining the head and torso as a single unit. The Bros apparatus allows the head and torso to accelerate at different velocities if a collision occurs. Likewise, Goor, et al., shows using a head restraint (26) for protection during an impact. In a collision, and in particular in the event of a rear-end collision, the Goor, et al. device will not prevent infant head and neck injury. The apparatus fails to restrain the torso and head as a single unit. It uses the standard straps available in conventional infant seats to restrain the torso, along with a supplementary head restraint the functions independently from the seat straps. In a rear end collision the infant's torso and head will be instantaneously and individually accelerated, in a direction opposite the force of impact. The unequal acceleration between the torso and the infant head restrained at (26) will result in very serious injury.

In a paper published in *Pain*, Vol. 58, 1994, p. 402, by Barnsley, Lord and Bogduk, the authors teach that, in collisions injury results from the relative acceleration between the head and the trunk of the occupant, the relative acceleration creating excessive torque and shear on the structures of the neck. Relative acceleration between head and trunk is dependent and proportional to the acceleration achieved by the struck vehicle. In the case of the prior patents, where the occupant's head is restrained independent of a torso restraint system, the inertial acceleration of the head and trunk will be unequal and thereby cause serious head and/or neck injuries.

An expanding wealth of information shows that rapid changes in acceleration, deceleration and sudden rotational movement of the head can cause closed head injuries (CHI). In his paper presented in the publication *Headache* 1989, p. 644, Dr. Speed teaches that CHI can occur without having an impact. He teaches that sudden unexpected force changes are sufficient to produce symptomatic brain injuries typical of CHI. Dr. Speed's research is directed to CHI in adults. Adults are able to brace and protect themselves during collisions, or sudden accelerations, decelerations and unexpected changes in directions. Adults have fully developed ligaments, and yet, CHI and whiplash injuries are common in adults when they are involved in vehicular collisions. The so-called whiplash injury results from either sudden hyperextension or by sudden hyperflexion of the neck. These injuries are very common in vehicle collisions. Additionally, taught by as Dr. Speed, whiplash injury can occur without impact. A sudden unexpected change in acceleration or deceleration can precipitate whiplash injury.

Infants are totally defenseless against these sudden force changes and they need to be properly supported to protect them against injury while riding in a moving vehicle. Proper infant support involves much more than just simply strapping the infant into a car seat to hold the baby in the event of an impact. It involves supporting and restraining the infant's head and torso equally to force the head and torso to react as a single component when subjected to any sudden change in force. This unified restraint will prevent a difference in relative acceleration between the head and torso of the infant during a collision. Relative acceleration between an infant's head and torso must be equalized during any unexpected vehicular event including violent collisions as well as normal changes in force such as accelerations, decelerations or changes in vehicle direction.

SUMMARY OF THE INVENTION

Therefore the primary object of the disclosed invention is to provide an improved restraint apparatus for use an infant vehicle seat, and in particular it is directed to reducing head and neck injury in infants riding in a moving vehicle. The improved restraint apparatus comprises a shell and padded lining shaped to partially enclose an infant when the restraint apparatus is attached to the infant vehicle seat. A first envelope of support is formed in an upper portion of the shell and padded lining to receive and support an infant head. The first envelope of support provides a restraint against both longitudinal and transverse head movement. A second envelope of support is formed in a lower portion of the shell and padded lining to receive and support an infant torso. The second envelope of support provides a restraint against longitudinal and transverse torso movement comparable to the restraint against head movement provided by the first envelope of support. The first and second envelopes of support provide a unified restraint between the head and torso when the restraint apparatus is attached to the infant vehicle seat.

It is also an object of this invention to provide a padded lining having soft glove like pockets that are shaped to receive, support and restrain an infant head and torso. The lung is removable to provide for changing the padded lining to fit different head and torso sizes. The padded lining also includes distinct areas of different density in the padding that absorbs the energy generated by an impact. The areas of different density apply a gradual increase in resistance against the head and torso as they are forced against the padding.

It is also an object of this invention to provide means for fitting the restraint apparatus to different infant length sizes. This is accomplished using a fastening means that provides a selection of different locations for attaching the restraint along the length of the infant vehicle seat.

These and other objects and advantages of the invention will be readily apparent in view of the following description and drawings.

BRIEF DESCRIPTION OF THE DRAWINGS

FIG. 8 is a plan view showing an equivalent means for removably fastening the restraint apparatus to an infant vehicle seat.

DETAILED DESCRIPTION OF THE PREFERRED EMBODIMENT

Large gravitational "G" forces can be generated during unexpected events that occur while riding as a passenger in a vehicle. These forces are the result of sudden events such as accelerations, decelerations, changes in vehicle direction, and moving vehicle accidents (MVA). While most adults and larger children involved a MVA have muscle strength and bone mass to fight against the high G forces by bracing themselves, many of these passengers are injured, and current medical trauma literature shows that 88% of these MVA patents continue to have symptoms 10.8 years after the accident. In the case of infants, and in particular in the case of infants that are six month or less in age, the tendons and bones have not yet developed to a point where the baby can support its own head weight, let alone fight against the increased G forces that occur during an impact with another vehicle.

The dynamics of head injuries have been reported extensively in scientific literature. Some of the more important findings teach that: a) if the head is turned at the moment of impact, there is increased injury on the side to which the head is turned; b) if the passenger is caught by surprise, unaware of the impending impact, it worsens the prognosis; and c) injury results from a difference in relative acceleration between the head and torso of the passenger.

In the case of a newborn infant, the baby is completely helpless during the first few months of life. It needs to be supported and protected under the most gentle of conditions. For example, a mother supports her baby's head while lifting it from a crib. Therefore, it is reasonable to conclude that it is essential to support a newborn infant under the hostile conditions that are encountered while riding in a fast moving vehicle.

Figure 1:
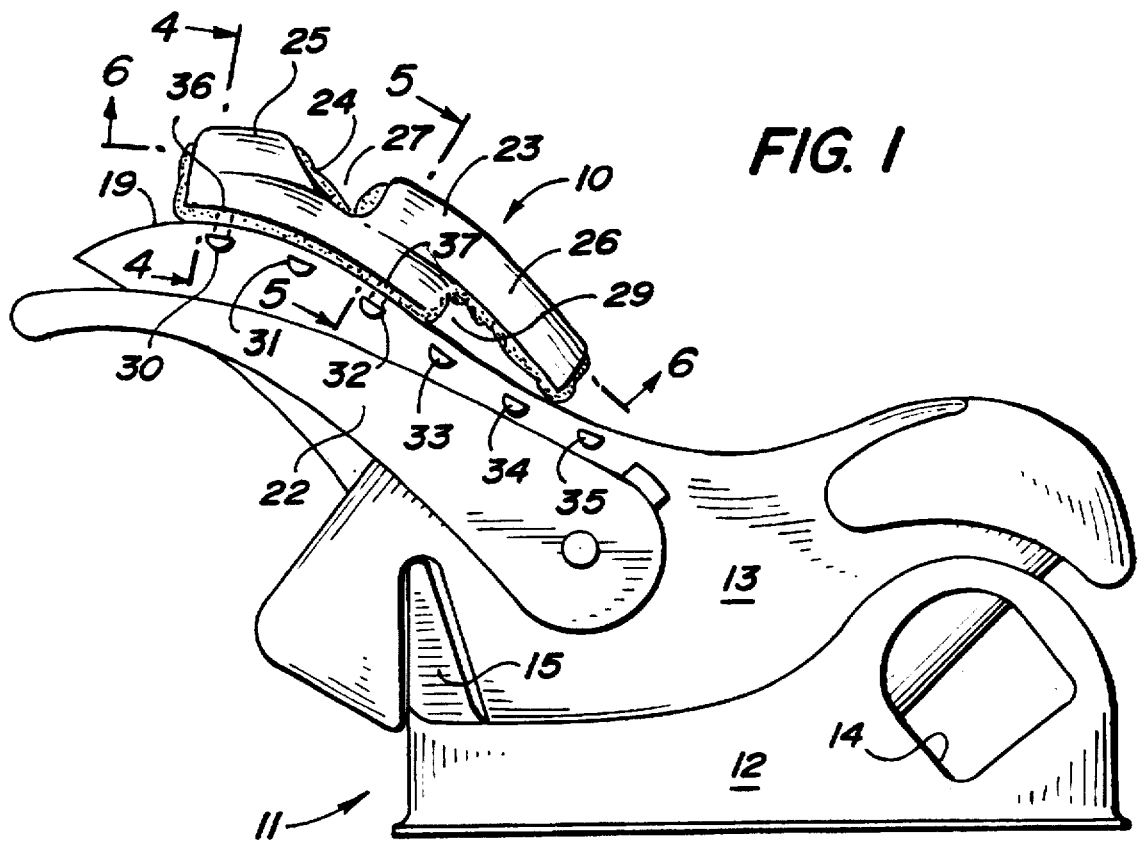
FIG. 1 is a side elevation view showing the preferred embodiment of the restraint apparatus of the invention.
Figure 2:
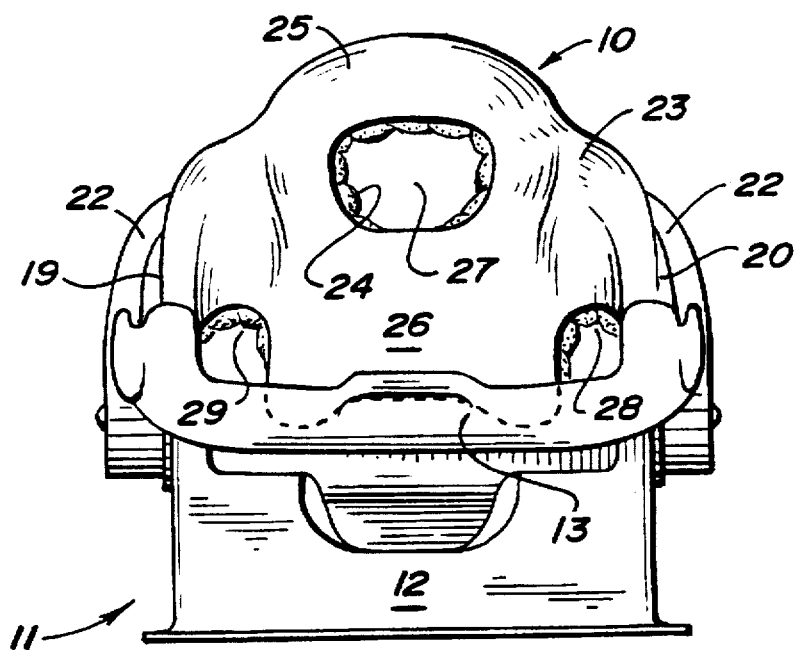
FIG. 2 is a front elevation view of the apparatus shown in FIG. 1.
Figure 3:
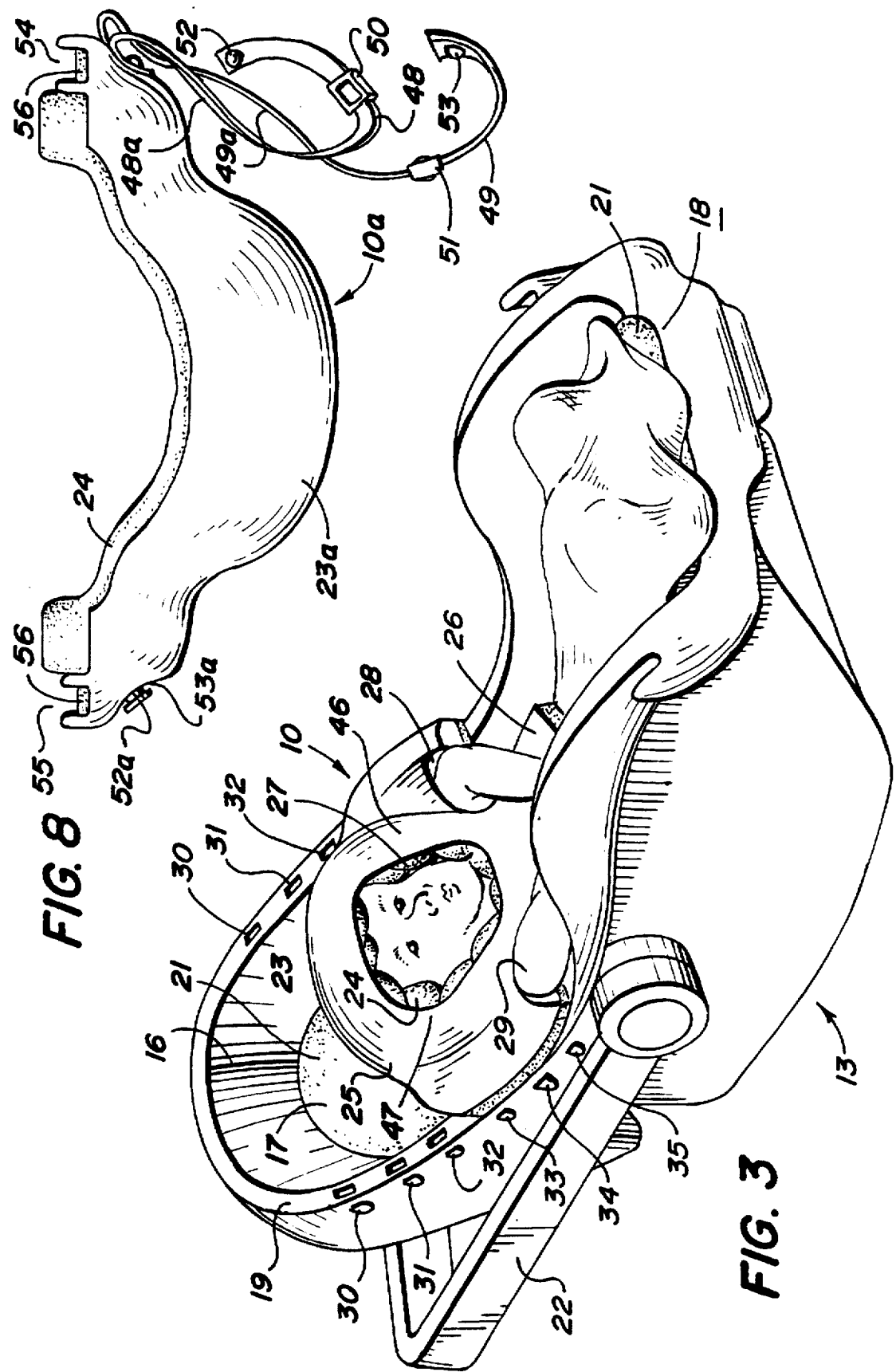
FIG. 3 is a perspective view of the preferred restraint apparatus attached to an infant vehicle seat.

Referring to FIGS. 1–3 of the drawings, the preferred embodiment of the invention comprises an infant safety restraint 10 that is removably attached to an infant vehicle seat 11. The typical state-of-the-art infant seat will include a permanent base 12 and a removable, portable seat portion 13. The base 12 is fastened to the vehicle seat by latching the vehicle seat belts tightly through openings 14 provided in the base. Base 12 also includes a locking mechanism 15 to either engage or disengage a cooperating mechanism located on the underside of the portable seat portion 13.

The portable seat portion includes a continuous base 16, more clearly shown in FIG. 3, having an upper portion or backrest 17 that supports the head and upper torso of an infant, a lower portion 18 that supports the legs, and siderails 19 and 20 that extend along the periphery of the base 16. The base 16 and siderails 19 and 20 define a cavity that is shaped to loosely receive the infant. Padding 21 is placed within the cavity to provide a degree of comfort for the baby. A harness arrangement (not shown) is attached to the portable seat 13 to hold but not restrain movement of the infant within the seat, and a carrying handle 22 is provided for adult convenience.

Even though state-of-the-art infant vehicle seats 11 have been designed to hold babies securely within a vehicle, as heretofore described, the prior designs have failed to recognize the need to equally support and restrain the infant's head and torso against both longitudinal and transverse movement. In particular, the prior seat designs have completely failed to recognize the important need to prevent a difference in relative movement or acceleration between the head and torso during an impact, and especially during a rear-end impact when the infant is facing toward the rear of the vehicle. This type of MVA would result in a hyperflexion type injury to the infant. Therefore, a rear-end impact with the infant facing toward the rear of the vehicle delivers the same type injury as if the infant were facing the front in a front-end collision.

Manufactures of state-of-the-art infant vehicle seats recognize this problem and provide explicit warnings against placing the seat in a forward direction toward the front of the vehicle. They warn that failure to follow their instructions may result in serious injury, crippling, or even death to the infant riding in a forward facing vehicle seat. However, they appear to fail to recognize that the same high G forces are thrust upon the rear facing infant in a rear-end collision. In such instances, the infant is exposed to the same type serious injuries or death conditions cautioned against on the seat warning labels.

Referring again to FIGS. 1–3, the improved restraint apparatus shown in the preferred embodiment provides a safety restraint 10 that is removably attached to the side rails 19 and 20 of the portable seat portion 13 of an infant vehicle seat 11. The restraint apparatus comprises an outer shell 23 molded from a high impact material, and a padded lining 24 attached to the inside surface of the shell. The safety restraint includes an upper portion 25 shaped to receive support on the infant's head, and a lower portion 26 shaped to receive and support the upper torso of the infant. A face opening 27 extends through the upper portion 25 and arm openings 28 and 29 are provided in the lower portion 26 at a location adjacent the siderail portions 19 and 20. Air holes, not shown, may also extend through the shell and padded lining to provide ventilation as disclosed in U.S. Pat. No. 4,790,593 granted to Davalos, et al.

A plurality of fasteners 30–35 extend along the length of the siderails 19 and 20. Fasteners 30–35 cooperate with fasteners 36 and 37 that extend outward from the safety restraint device 10, and fasteners 30–35 provide means for selectively fastening the safety restraint along the length of the siderails 19 and 20 at preselected positions corresponding to different length sizes in infants. For example, fasteners 30 and 32 are located to receive fasteners 36 and 37 to position the safety restraint along the siderails 19 and 20 at a location that fit a 24 inch or longer infant. Likewise, fasteners 31 and 33 are positioned to fit a 21–24 inch baby, fasteners 32 and 34 fit an 18–21 inch baby, and finally, fasteners 33 and 35 are located to receive fasteners 36 and 37 respectively to position safety restraint 10 at a location fitting an infant less than 18 inches in length.

It should be understood that the above described safety restraint positions are only an example. Different position arrangements can be used without departing from the scope of this invention.

Figure 4:
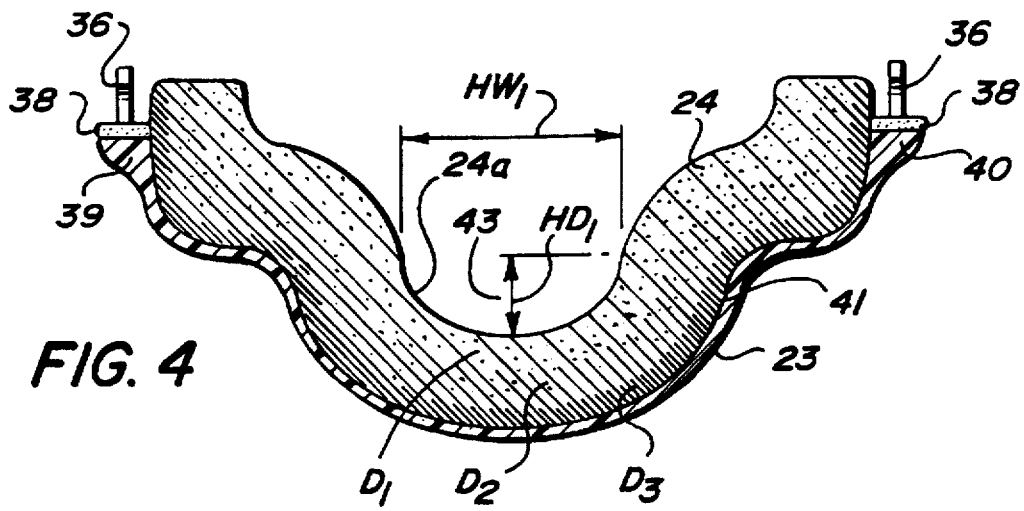
FIG. 4 is a cross-section view taken along the lines 4—4 of FIG. 1.
Figure 6:
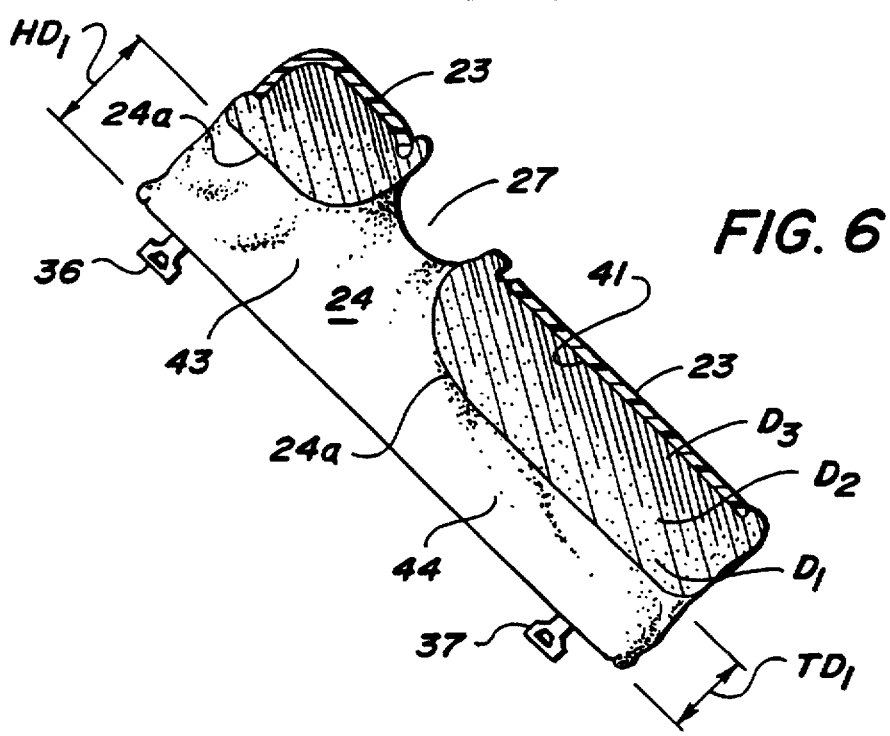
FIG. 6 is a cross-section view taken along the lines 6—6 of FIG. 1.
Figure 5:
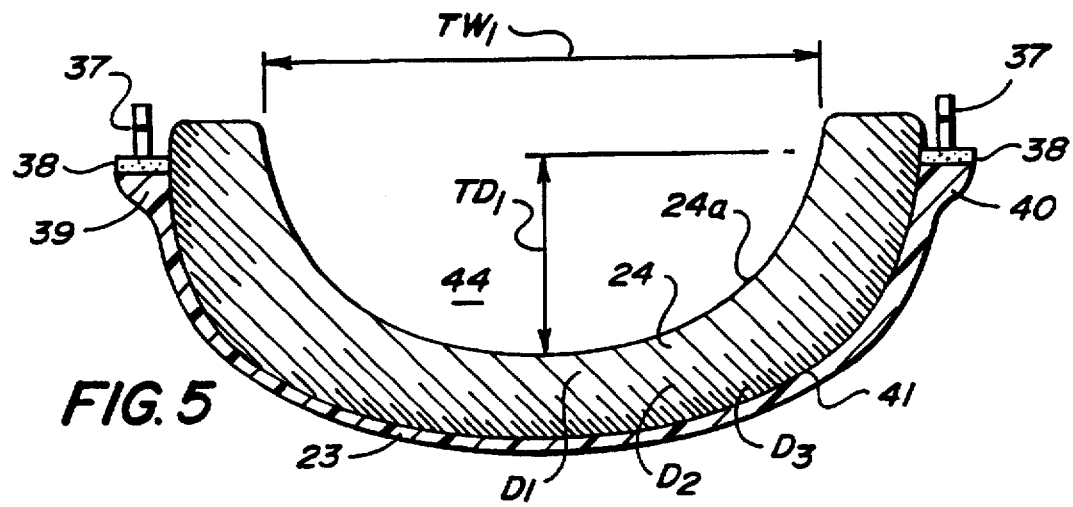
FIG. 5 is a cross-sectional view taken along the lines 5—5 of FIG. 1.

Referring now to FIGS. 4–6, cross-sectional views taken along the lines 4—4, 5—5 and 6—6 in FIG. 1, shell 23 comprises a continuous molded form that is suitably shaped to partially surround the head and upper torso of an infant when the restraint apparatus 10 is fastened to the siderails 19 and 20 of the infant vehicle seat 11. The molded shell 23 includes a first enlarged edge having a surface 39 for engaging siderail 19 and a second enlarged edge having a surface 40 for engaging siderail 20. A dense compressible material 38 is attached to the surfaces that engage the siderails, and the compressible material can be pressed into a shape that will approximate the profile 39 of siderails 19 and 20 when the safety restraint 10 is attached to a selected position on seat 13. The fasteners 36 and 37 extend through the compressible material 38 to engage their respective fasteners 30–35 in the siderails.

It should be understood that the safety restraint may be attached to the infant vehicle seat using any equivalent attachment means that is well known in the art. For example, in FIG. 8, shows the plan view of the restraint apparatus where an equivalent fastening means is provided for attaching restraint apparatus to an infant juvenile seat 10a. The restraint apparatus 10a includes at least two adjustable belts or straps 48 and 49 having first ends 48a and 49a fixed to the restraint apparatus. Each strap 48 and 49 includes a buckle 50 and 51 to adjust the strap lengths, and fasteners 52 and 53 for attachment to corresponding fasteners 52a and 53a located on the safety restraint. Fasteners 52–52a and 53–53a can be velcro, snaps, clips or any other suitable fastening means well known in the art. In FIG. 8, fastener 53a is not clearly shown because in the plan view 53a is hidden by fastener 52a.

The molded outer shell 23a of restraint apparatus 10a includes a first enlarged edge having a yoke shape 54 for engaging a siderail of the infant vehicle seat, and a second enlarged edge having a yoke shape 55 for engaging the opposite siderail of the infant vehicle seat. A dense compressible material 56 is attached to the yoke surface that engages the siderail edges of the infant vehicle seat. When the restraint apparatus is fastened to the infant vehicle seat the compressible material is pressed into a shape that approximates the profile of the siderails, as heretofore described in the preferred embodiment.

The restraint apparatus is removably attached to the infant vehicle seat with straps 48 and 49. To attach the restraint, the strap lengths are adjusted with buckles 50 and 51 to a length that will hold yokes 54 and 55 firmly against the seat siderails when straps 48 and 49 are passed around behind the infant vehicle seat, as shown in FIG. 8, to connect the fasteners 52–52a and fasteners 53–53a. Straps 48 and 49 allow the restraint apparatus 10a may be positioned at any location along the length of the siderails to adjust for infant length size.

As heretofore mentioned, a padded lining 24 is attached to the inside surface 41 of shell 23. The padded lining may be attached with velcro 42 or by using other suitable fastening means well known in the art such as snaps. Referring again to FIGS. 4–6, the padded lining is shaped to provide a soft glove like first pocket 43 shaped to receive, support and restrain an infant's head, and a soft glove like second pocket 44 shaped to receive, support and restrain the upper torso of an infant.

As more clearly shown in FIG. 4, the first pocket 43 has a width dimension $HW_1$ and a depth dimension $HD_1$. Similarly, in FIG. 5, the second pocket 44 has a width dimension $TW_1$ and a depth dimension $TD_1$. The width and depth dimensions for pockets 43 and 44 are sized to approximate the head and torso shapes of an infant based upon a selected infant weight size. The padded lining 24 is removable to provide means for substituting an assortment of different padded liners having different pocket sizes that accommodate larger or smaller infant weight sizes.

Figure 4A:
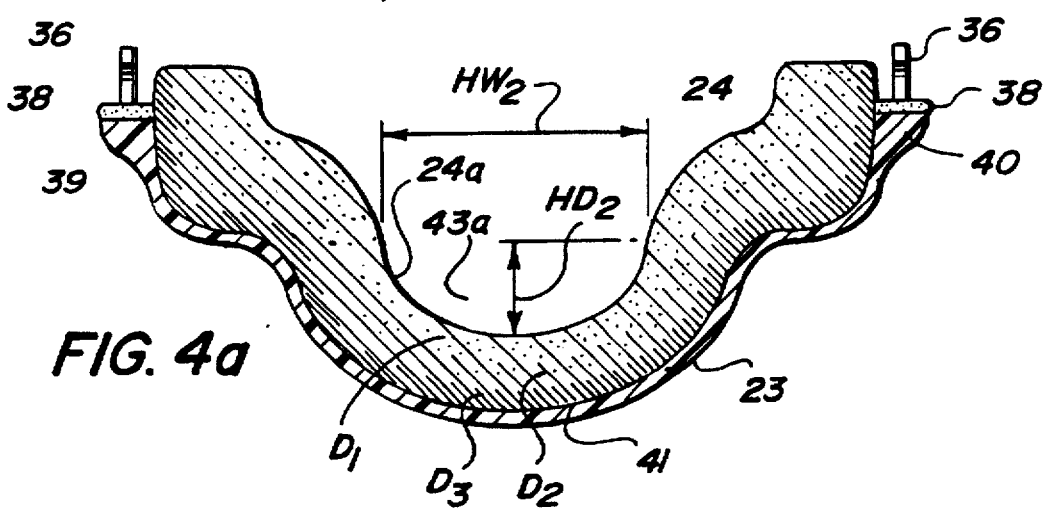
FIG. 4a is a cross-section view similar to FIG. 4 showing a padded lining for a larger infant.
Figure 5A:
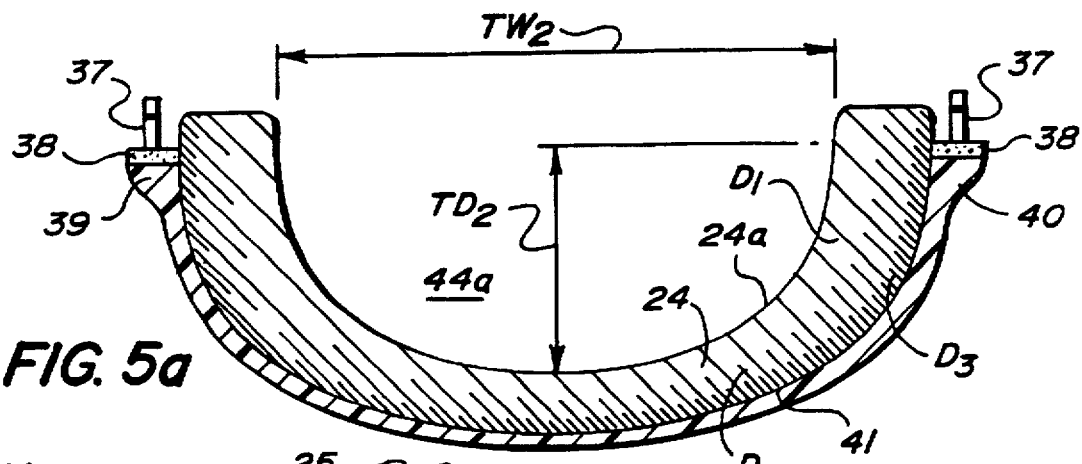
FIG. 5a is a cross-section view similar to FIG. 5 showing a padded lining for a larger infant.

For example, referring to FIGS. 4a and 5a, a padded lining for a larger infant weight size, as compared to FIGS. 4 and 5, is shown attached to the inside surface 41 of shell 23. FIG. 4a shows the first pocket 43a having a width dimension $HW_2$ that is larger than the width dimension $HW_1$, and a depth dimension $HD_2$ that is greater than the depth dimension $HD_1$. Likewise, in the torso portion shown in FIG. 5a, the second pocket 44a has a width dimension $TW_2$ greater than the width dimension $TW_1$ and a depth dimension $TD_2$ greater than the depth dimension $TD_1$.

Any number of different removable padded linings 24 can be provided to accommodate any selection of different infant weight sizes. An exemplary selection of pad sizes could comprise a first, smallest pad size having pockets shaped to receive infants weighing less than 5 pounds, a second pad size could be shaped to receive infants weighing between 5 and 10 pounds, a third pad could have even larger pockets to receive infants weighing from between 10 to 15 pounds, and the largest pad size could have enlarged pockets 43 and 44 shaped to fit an infant weighing more than 15 pounds but less than 20 pounds. It should be understood that the above four pad sizes are only an example and any number of padded linings for any different selection of infant weight sizes may be provided without departing from the scope of this invention.

Figure 7:
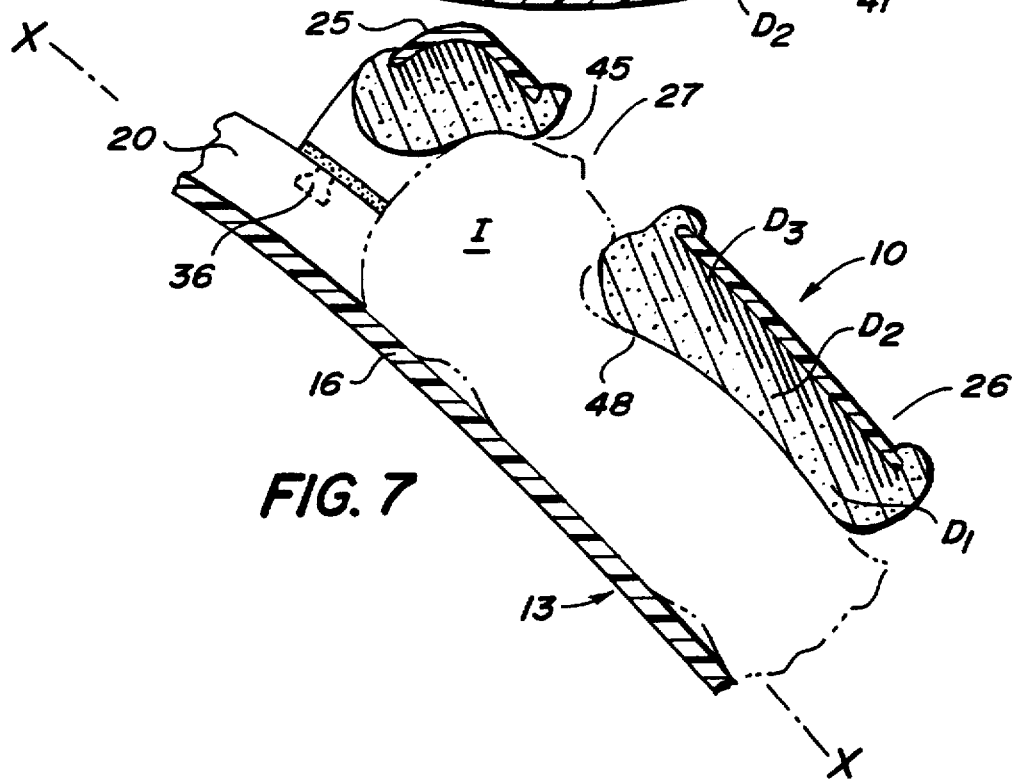
FIG. 7 is a view similar to FIG. 6 showing the restraint apparatus attached to an infant vehicle seat.

FIG. 7 shows a simple infant outline "I" positioned within seat 13 and enclosed by the restraint apparatus 10. The upper portion 25 of restraint 10 provides a first envelope of support shaped to gently bear against the infant's head beginning above the brow line at 45 and extending in a downward direction as parallel like shapes 46 and 47 (shown in FIG. 3), along both sides of the face to provide the face opening 27. The first envelope of support provides both longitudinal and transverse head support and restraint against head movement with respect to the infant seat axis X—X shown in FIG. 7.

The lower portion 26 of restraint 10 provides a second envelope of support that gently bears against the infants upper torso length beginning at a location 48 below the neck line and extending in a downward direction to a location above the waste line. The second envelope of support provides both longitudinal and transverse torso support and restraint against torso movement with respect to the axis X—X. The second envelope of support applies a restraining force against torso movement comparable to the restraining force applies against head movement provided by the first envelope of support. In this way the first envelope of support and the second envelope of support cooperate to provide a unified restraint against the head and torso to prevent a difference in relative acceleration between the head and torso of an infant when restraint 10 is fastened to an infant vehicle seat.

Various studies show that, depending upon the speed of an impact, forces can be generated in the range of between 5–30 G. In instances where an infant's head and torso are equally supported within a restraining apparatus as disclosed in the preferred embodiment, where relative acceleration between the head and torso is equalized, CHI can still occur if the restraining device fails to properly cushion and absorb the energy generated during an impact. For example, in a 15 mph collision the head would accelerate with a force of 10 G. Therefore, it follows that in order to reduce CHI, the restraining apparatus must include an energy absorbing means capable of gently cushioning the accelerating head and torso to absorb the energy generated by the impact.

Referring again to the cross-sections shown in FIGS. 4–6, the padded lining 24 comprises a foam like material having distinct areas of different density padding, for example, the density of the lining decreases in a direction away from the shell 23 and toward the lining surface 24a adjacent the infant. In the preferred embodiment, padding 24 is shown comprising three different density areas, as illustrated by the different cross-hatching. The most dense and least compressible portion of the padded lining 24 is shown as $D_3$ located adjacent the inside surface 41 of shell 23. The least dense and most compressible portion of the padding is shown as a soft area $D_1$ located along surface 24a adjacent the infant. Padding density $D_1$ provides the soft glove like pockets 43 and 44 that cushion the infant. Positioned between the two different padding densities $D_1$ and $D_3$ is an additional padding having an intermediate density shown as $D_2$. This arrangement provides a gradual increase in lining density in a direction away from the infant and toward the outer shell 23. The increasing lining density provides a "low impact pad" that will more gently absorb the energy generated during an impact and reduce the likelihood of a concussion or CHI. The areas of different density reduce the impact force by gradually applying an increasing resistance against the infant's head and torso as they are forced against the padding in response to a vehicular event. Although the preferred embodiment shows the padded lining 24 having three different areas of density, any number of different densities areas can be provided in the padding without departing from the scope of the invention.

While this invention has been described as having a preferred embodiment, it is understood that it is capable of further modifications, uses, and/or adaptations of the invention, following the general principle of the invention and including such departures from the present disclosure as have come within known or customary practice in the art to which the invention pertains, and as may be applied to the central features hereinbefore set forth, and fall within the scope of the invention of the limits of the appended claims.

I claim:

1. A restraint apparatus for use with an infant vehicle seat to reduce injury by applying a unified restraint against the head and torso of an infant riding in the seat, the restraint apparatus comprising:
   a) a shell having a padded lining and a fastening means to attach said restraint apparatus to the infant vehicle seat;
   b) a first envelope of support formed in an upper portion of said shell and padded lining, said first envelope of support shaped to receive and restrain an infant head, said first envelope of support providing a restraint against head movement; and
   c) a second envelope of support formed in a lower portion of said shell and padded lining, said second envelope of support shaped to receive and restrain an infant torso, said second envelope of support providing a restraint against torso movement comparable to said restraint against head movement provided by said first envelope of support, said first envelope of support and said second envelope of support producing a unified restraint against head and torso movement when said restraint apparatus is attached to the infant vehicle seat wherein said shell equalizes relative acceleration between the head and the torso of the infant thereby causing the head and torso to uniformly react to a sudden change in force.

2. The apparatus recited in claim 1 wherein:
   a) said first envelope of support provides a restraint against longitudinal and transverse head movement; and
   b) said second envelope of support provides a restraint against longitudinal and transverse torso movement comparable to said restraint against longitudinal and transverse head movement provided by said first envelope of support, said first envelope of support and said second envelope of support producing a unified restraint against longitudinal and transverse head and torso movement when said restraint apparatus is attached to the infant vehicle seat.

3. The apparatus recited in claim 1 wherein said unified restraint prevents a difference in relative acceleration between the head and torso of the infant when said restraint apparatus is attached to the infant vehicle seat.

4. The apparatus recited in claim 1 wherein:
   a) said first envelope of support includes a face opening extending through the shell and the padded lining of said restraint apparatus; and
   b) said second envelope of support includes at least one arm opening extending through said shell and said padded lining of said restraining apparatus.

5. The apparatus recited in claim 1 wherein said fastening means is positioned to removably attach said restraint apparatus to the infant vehicle seat at a location fitting a selected infant length size.

6. The invention recited in claim 5 wherein said fastening means comprises:
   a) a plurality of spaced apart fasteners positioned along the infant vehicle seat at locations corresponding to different infant length sizes; and
   b) fasteners extending from said restraint apparatus for removable attachment to any selected said spaced apart fasteners to removably attach said restraint apparatus at a location fitting a selected infant size.

7. The apparatus recited in claim 6 wherein said plurality of spaced apart fasteners include at least two locations fitting infant length sizes.

8. The apparatus recited in claim 5 wherein said fastening means includes at least one adjustable strap to removably attach said restraint apparatus to the infant vehicle seat.

9. The apparatus recited in claim 1 wherein:
   a) said first envelope of support includes a padded lining portion having a first pocket shaped to receive an infant head; and
   b) said second envelope of support included a padded lining portion having a second pocket shaped to receive an infant torso.

10. The apparatus recited in claim 9 wherein said padded lining includes padding having areas of different density.

11. The apparatus recited in claim 10 wherein said padding has the greatest density adjacent said shell.

12. The apparatus recited in claim 10 wherein said padding is least dense adjacent said first pocket and said second pocket.

13. The apparatus recited in claim 9 wherein said first pocket and said second pocket are shaped to fit the head and torso for a selected infant weight size.

14. The apparatus recited in claim 13 wherein said padded lining is removably attached to said shell of said restraint apparatus for replacing said padded lining with a different padded lining having a larger or a smaller first pocket and second pocket to fit a different infant weight size.

15. The apparatus recited in claim 1 wherein said padded lining includes padding having areas of different density.

16. The apparatus recited in claim 15 wherein said padding has the greatest density adjacent said shell.

* * * * *